United States Patent

[11] 3,595,074

| [72] | Inventor | Clarence Johnson |
| | | 31649 Trillium Trail, Cleveland, Ohio 44124 |
| [21] | Appl. No. | 771,868 |
| [22] | Filed | Oct. 30, 1968 |
| [45] | Patented | July 27, 1971 |

[54] TORQUE TRANSDUCER
34 Claims, 15 Drawing Figs.

[52] U.S. Cl. ................................................. 73/136 R, 308/2 A
[51] Int. Cl. ................................................. G01l 3/02
[50] Field of Search ..................................... 73/134, 135, 136, 9; 308/2

[56] References Cited
UNITED STATES PATENTS

| 2,385,005 | 9/1945 | Langer | 73/136 |
| 2,389,361 | 11/1945 | Hagg et al. | 73/134 |
| 2,845,795 | 8/1958 | Emmerling | 73/136 |
| 2,865,200 | 12/1958 | Gieseler | 73/147 |
| 3,285,057 | 11/1966 | Zurik | 73/136 X |
| 3,377,849 | 4/1968 | Lebow | 73/134 |
| 2,484,823 | 10/1949 | Hammond, Jr. | 308/2 X |
| 2,819,892 | 1/1958 | Huff | 308/2 X |

Primary Examiner—Charles A. Ruehl
Attorney—Strauch, Nolan, Neale, Nies and Kurz

ABSTRACT: A torque transducer for measuring the torque input or output of a rotary machine, such as a motor or generator, and comprising a pair of axially spaced apart end plates respectively fixed to the housing of the machine and to a fixed or stationary support surface coaxially of the machine's input or output shaft axis and a plurality of flexure plates each disposed axially between and clamped at opposite ends to the end plates. The rotary machine is supported solely by the torque transducer from the support surface such that when it is horizontally oriented it is mounted in cantilever fashion at the unsupported ends of the flexure plates. By operating such rotary machines as a motor or generator, a reaction or countertorque, which is proportional to the torque input or output, is produced and applied to the housing of the machine. The flexure plates are flexed and twisted under the influence of the applied reaction torque, allowing the housing of the machine to turn about the torque transferring shaft axis through an angle that is closely proportional to the torque input or output of the machine. This angle of rotation is measured to provide a readout of the magnitude of torque input or output.

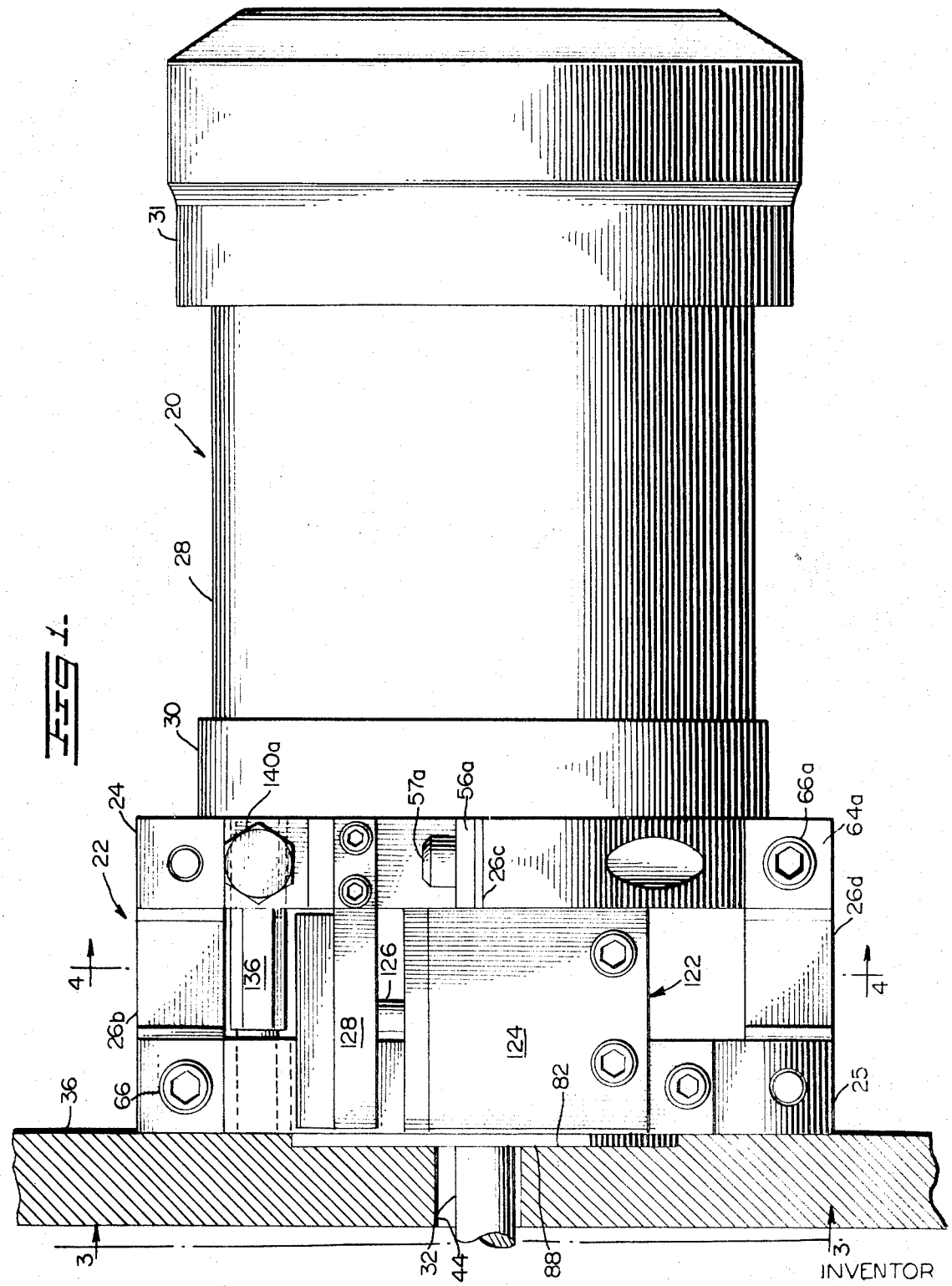

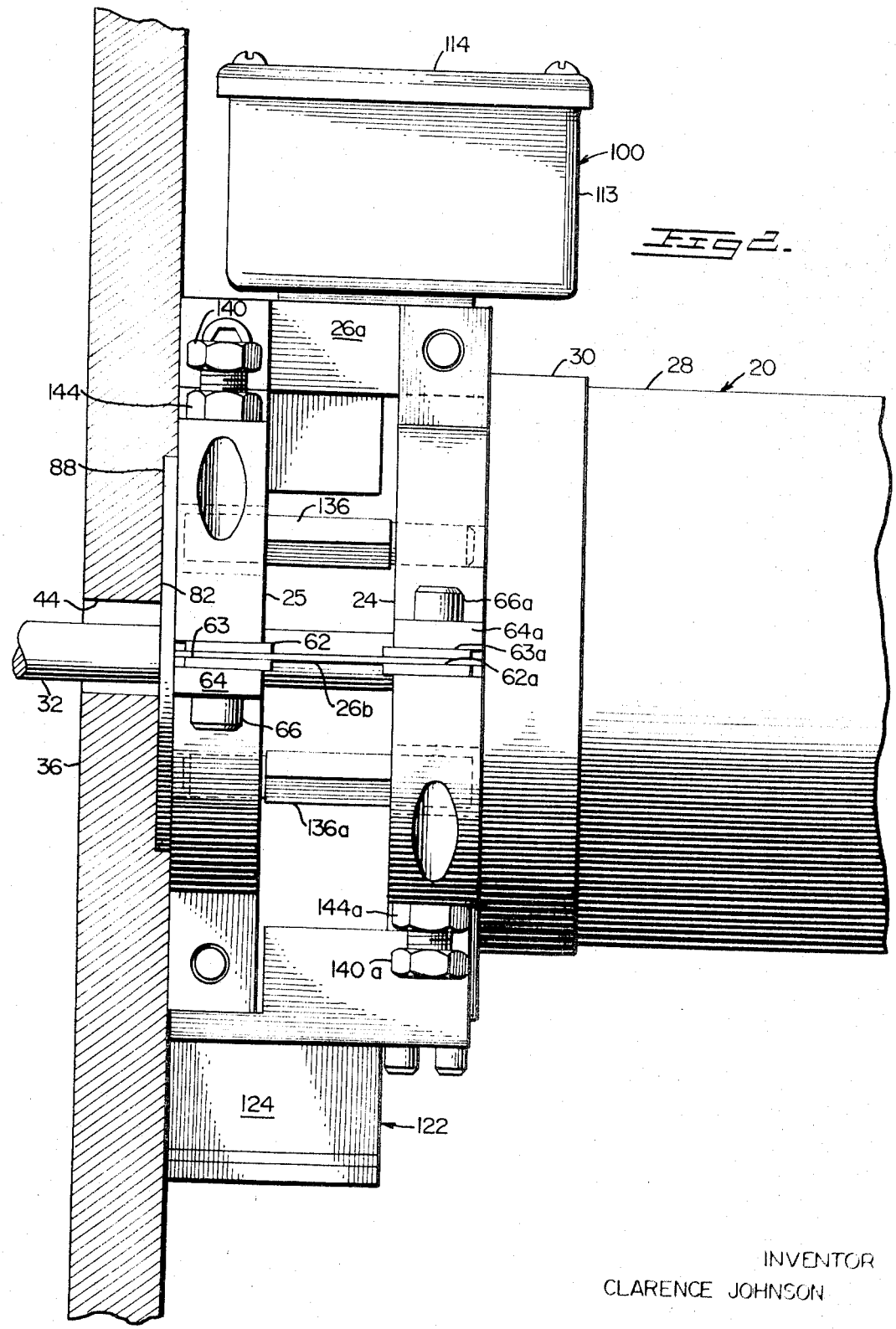

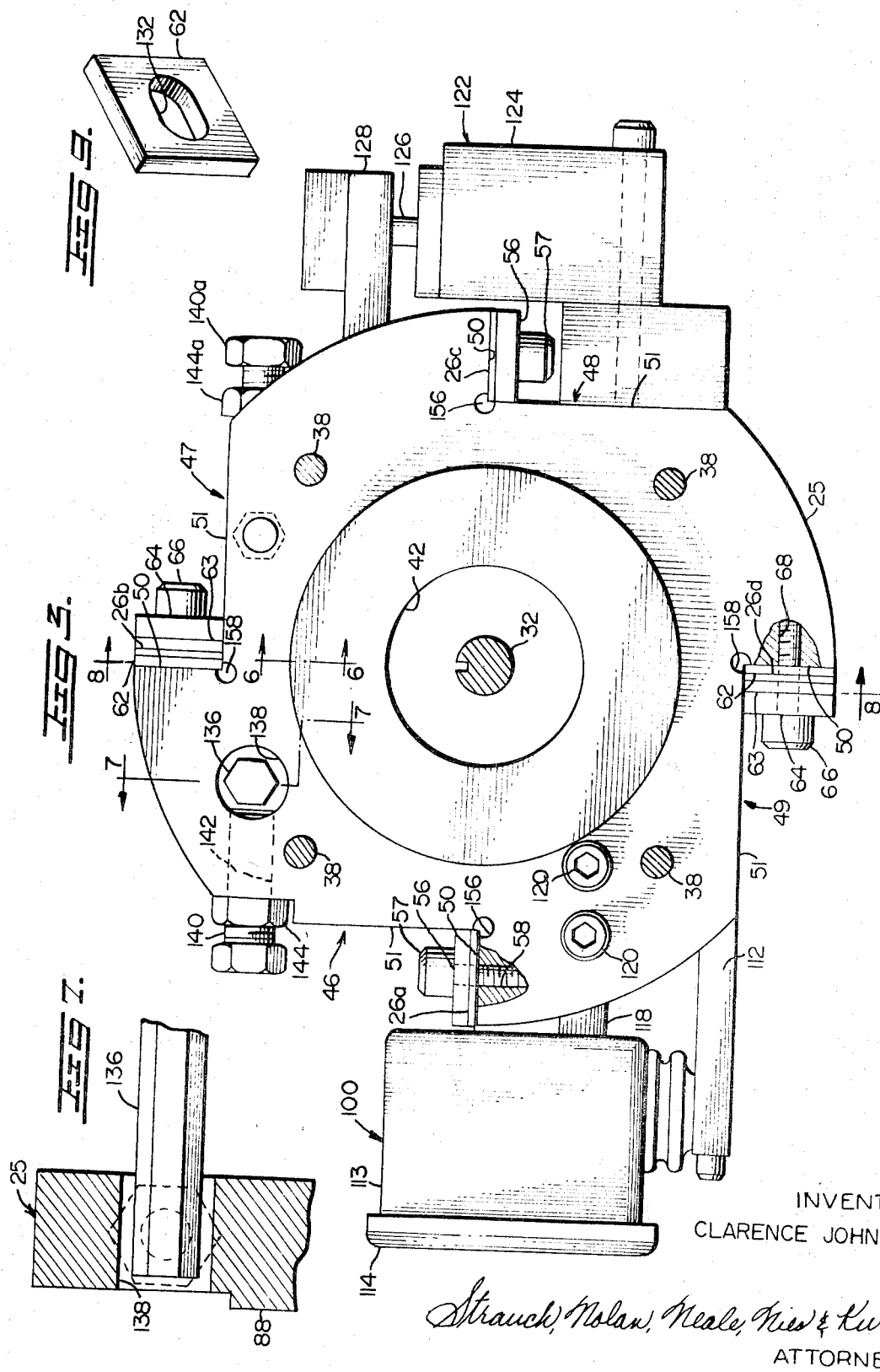

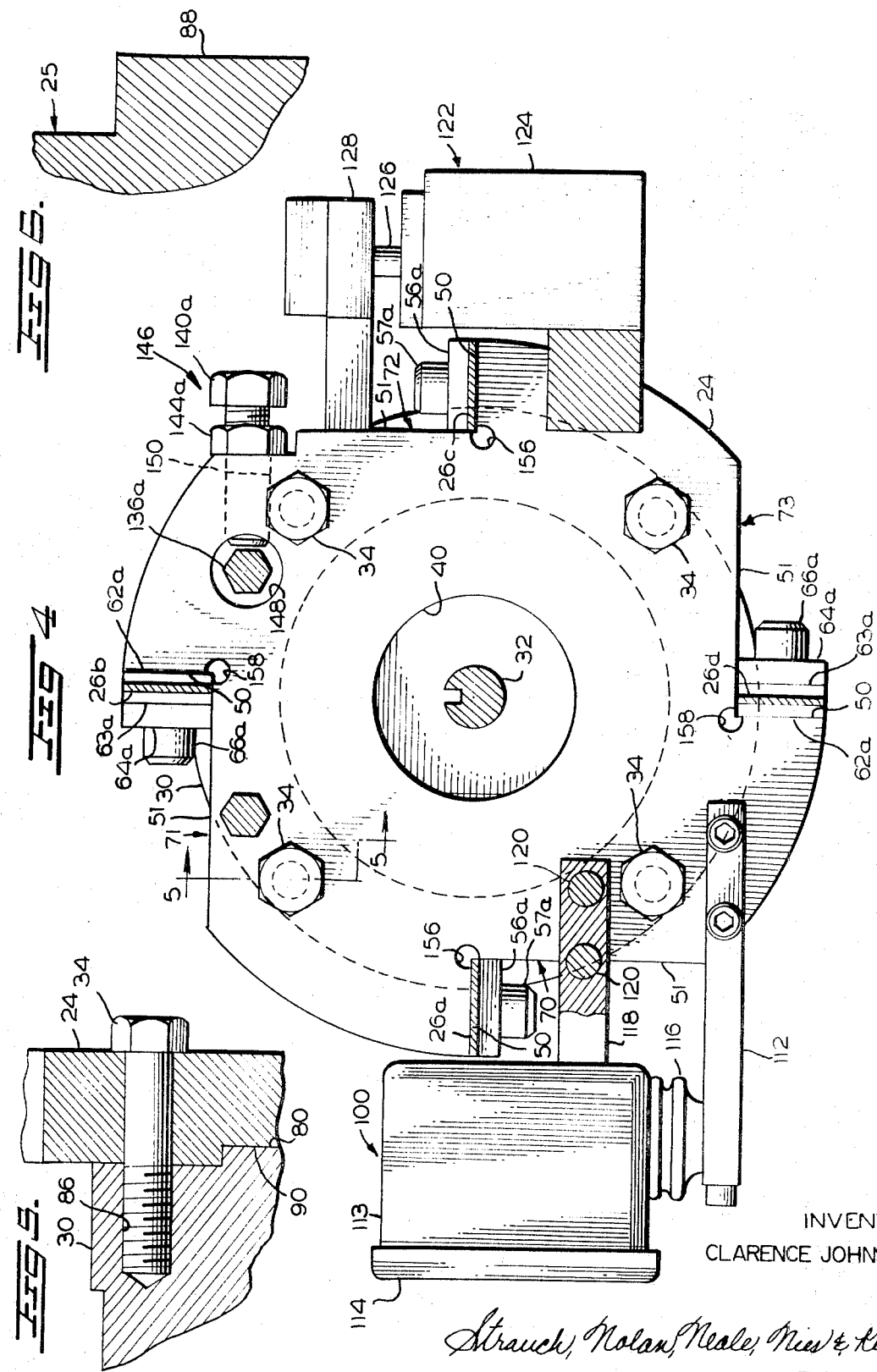

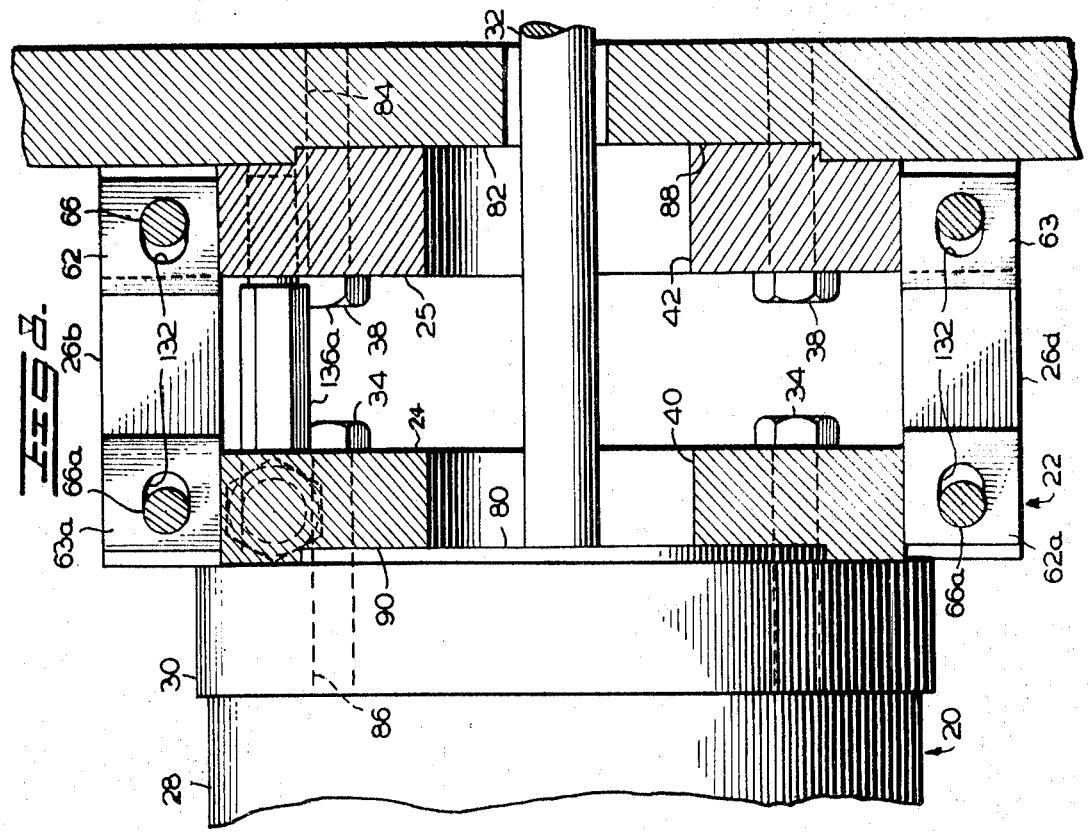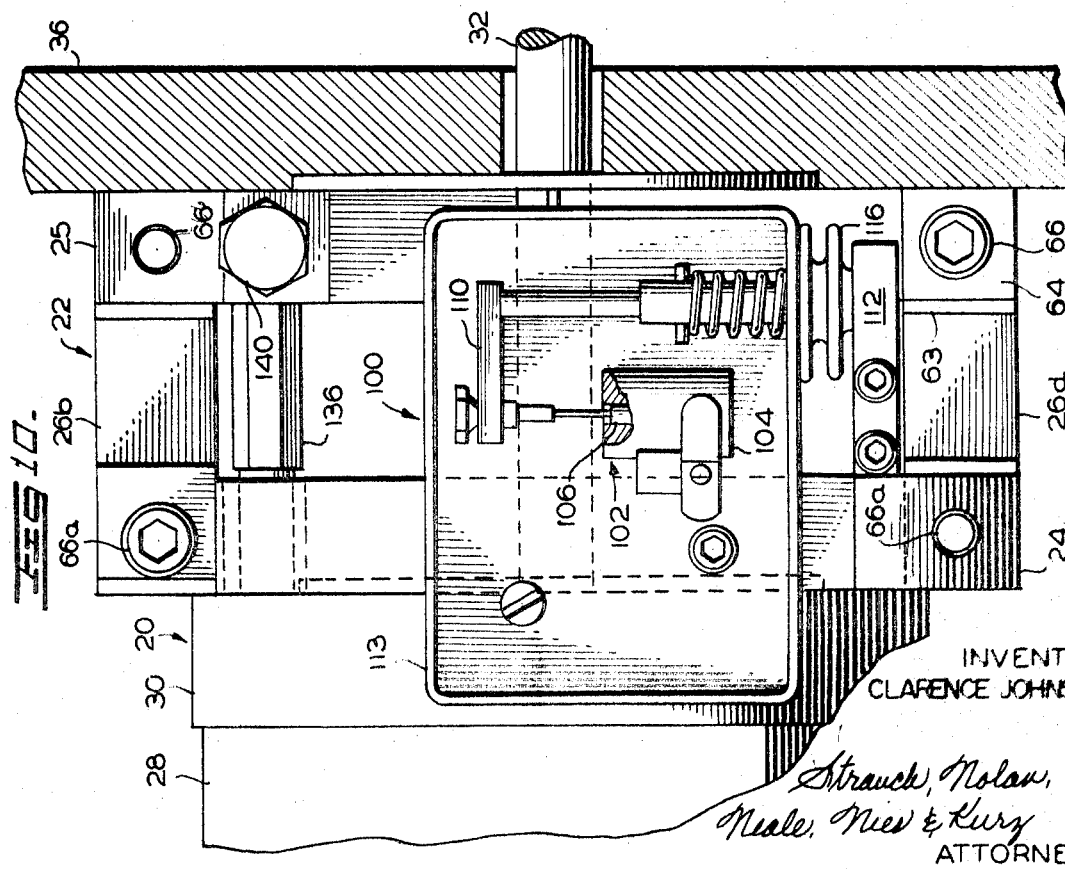

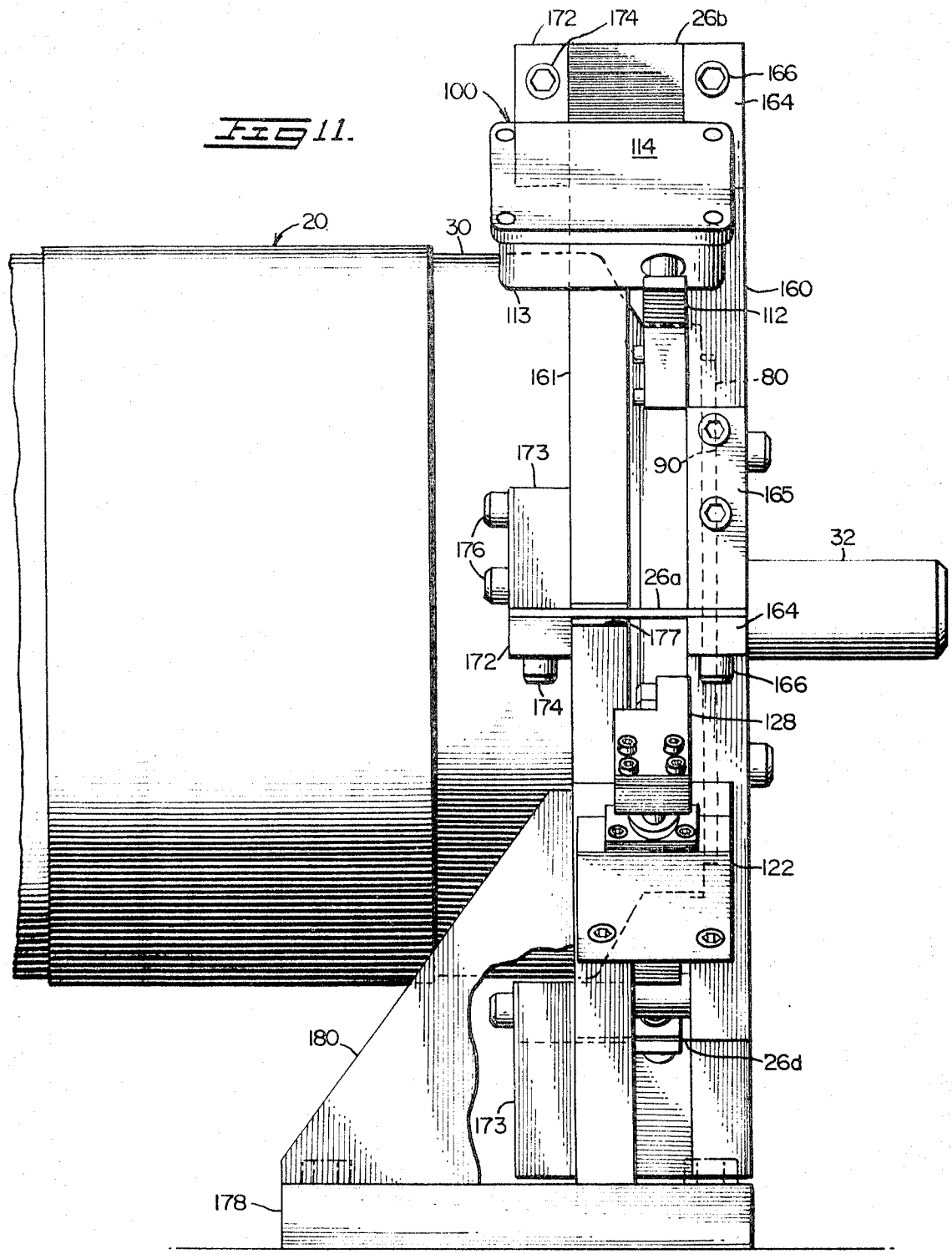

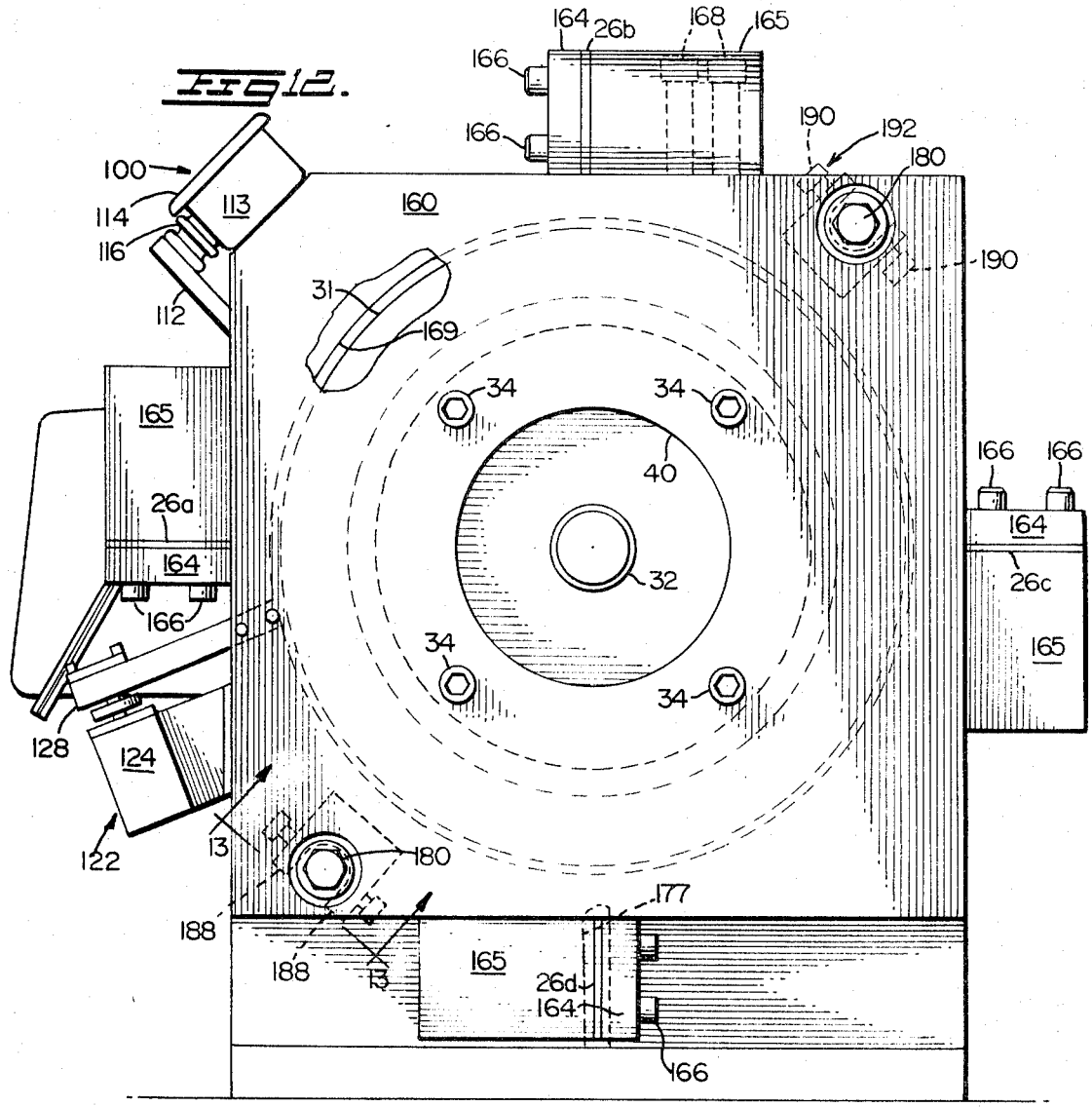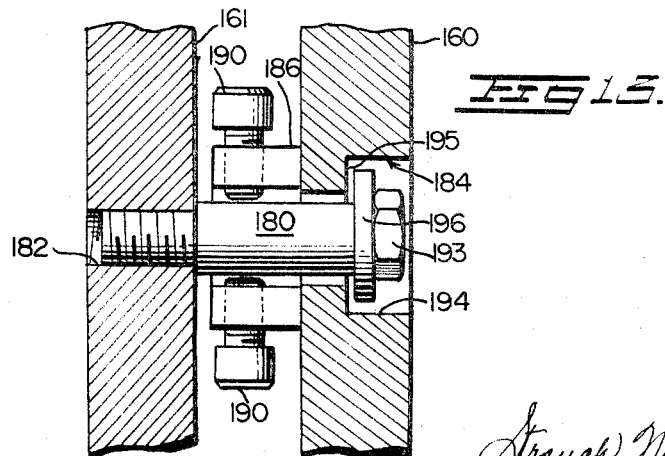

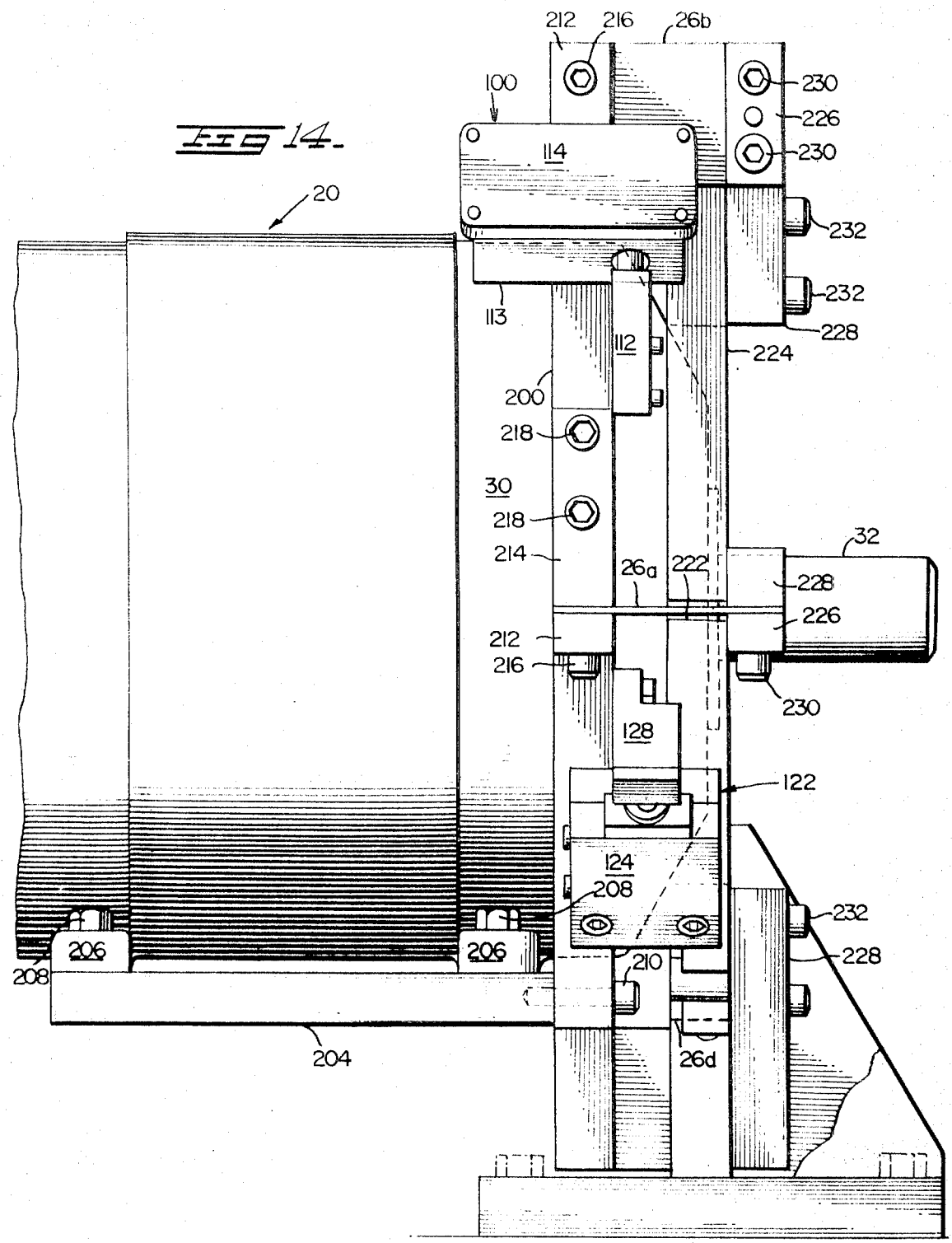

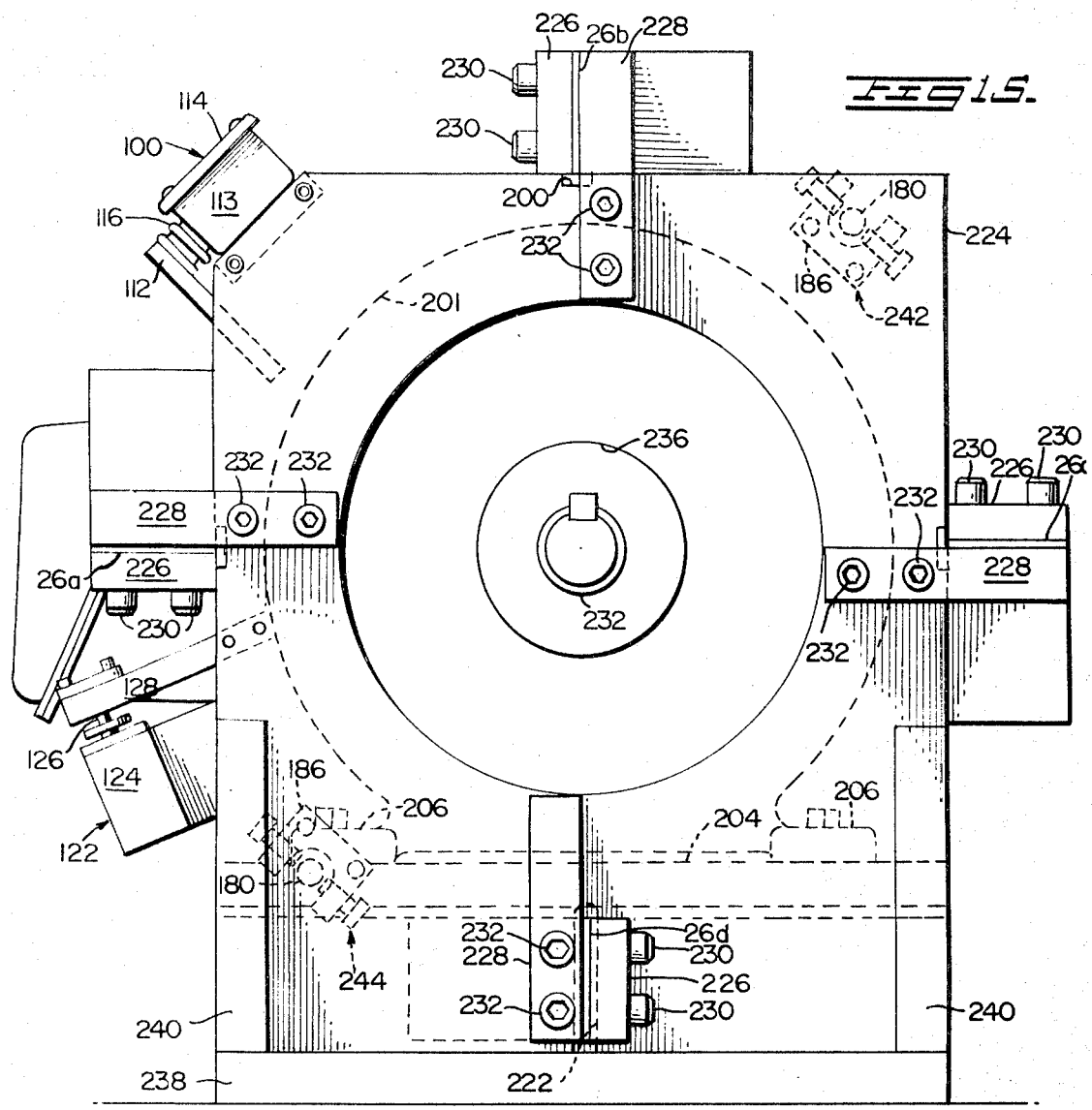

TORQUE TRANSDUCER

FIELD OF INVENTION

This invention relates to torque transducers of the type which sense the reaction torque developed by a rotary machine during its operation.

BACKGROUND

Rotary machines, such as, for example, motors or generators, produce, during operation, a reaction torque which is proportional to the torque input or output of the machine and which is applied to the housing of the machine, tending to rotate it about the machine's rotational axis. Prior to this invention, torque transducers have been proposed for sensing this reaction torque to provide a measurement of the torque supplied by or delivered to the machine.

One of the major shortcomings of such prior reaction type torque transducers is that by virtue of their construction they cannot easily and readily be adapted to off-the-shelf machines such as electric motors and generators. They furthermore are infrequently incorporated into existing installations because of the appreciable modification required by virtue of their construction.

SUMMARY AND OBJECTS OF THE INVENTION

In comparison with the prior reaction type torque transducers described above, the transducers of this invention are so constructed as to be adapted easily and readily to off-the-shelf motors and other rotary machines. The torque transducers of this invention are furthermore easily, quickly and inexpensively incorporated into existing installations with little or no modification of the equipment in the installation.

In accomplishing the foregoing, the torque transducers of this invention are constructed with a pair of end plates which are spaced axially apart along the rotational axis of the rotary machine and which are secured to each other only by a plurality of flexure plates extending axially between the two plates. The end plates are respectively secured to a stationary support and to the housing of the machine such that the rotary machine is supported in cantilever fashion at the unsupported or free ends of the flexure plates when it is oriented with its rotational axis in a horizontal plane. The rotary machine is supported solely from the end plate to which it is secured, and the reaction torque developed during operation and applied to the housing of the machine will twist and flex the flexure plates, causing the machine and the end plate to which it is fixed to rotate relative to the stationary end plate about the machine's rotational axis.

The torque transducer is axially compact and may be axially interposed in one embodiment between a motor end bell and an opposed support surface in coaxial surrounding relationship with the motor shaft. Further axial compactness is achieved in other embodiments of this invention wherein one of the transducer end plates mentioned above peripherally surrounds the housing of the rotary machine.

To horizontally support a motor or other rotary machine in cantilever fashion with the flexure plate torque transducer just described, a number of requirements must be met. First, alignment of the motor output shaft with the driven equipment must be maintained. In this connection, the housing of the motor or other machine must rotate precisely about the rotational shaft axis under the influence of the reaction torque which is applied during operation. Second, the transducer must allow sufficient rotation of the motor housing in order to be adequately sensitive to relatively small torque variations. Finally, the transducer should measure only tangentially directed forces and should be insensitive to radially directed forces.

In addition to the foregoing, the transducer should be relatively insensitive to temperature variations in order to maintain accuracy of measurement throughout a wide range of conditions. Of course, many of these requirements apply equally well to arrangements wherein the motor or other rotary machine is supported with its rotational axis in nonhorizontal planes.

To maintain alignment between the rotational axis of the rotary machine and the driven equipment (as in the case of a motor) or the driving equipment (as in the case of a generator) the flexure plates are required to be stiff enough to support the machine. On the other hand, the flexure plates must not be so stiff as to impair the sensitivity of the transducer by objectionably resisting rotation of the housing of the machine under the influence of the reaction torque. The conflict between these essential requirements is accentuated by the fact that the weight of a motor or similar machine is relatively large as compared with the torque. For example, a 3-horsepower motor weighs about 200 pounds and exerts a maximum torque in the neighborhood of only 27 foot-pounds.

According to this invention, the transducer flexure plates may be so dimensioned by virtue of their arrangement as to provide the necessary stiffness for supporting the motor or other rotary machine in accurate alignment with the driven or drive apparatus and for maintaining accurate rotation of the machine's housing about the rotational axis of the machine without objectionably impairing the sensitivity of the transducer. This is accomplished by arranging the flexure plates such that they face edgewise toward the rotational axis of the machine in planes extending radially of the rotational axis and by locating at least one of the flexure plates in a vertical plane. In a preferred embodiment for horizontally supporting a motor or other rotary machine in cantilever fashion, two flexure plates are contained in a radially extending vertical plane and two flexure plates are contained in a radially extending horizontal plane.

The foregoing flexure plate arrangement renders the torque transducer insensitive to radially directed forces and provides for the measurement of only tangentially directed forces. Furthermore, by virtue of supporting the motor or other rotary machine in cantilever fashion by the torque transducer of the invention, the torque measurements obtained are relatively insensitive to temperature variations.

With the foregoing in mind, it is a major object of this invention to provide a novel torque transducer which is particularly adaptable for assembly with off-the-shelf motors and other rotary machines and which is also capable of being incorporated into existing installations with no significant modification of the equipment in the installation.

Another object of this invention is to provide a novel reaction type torque transducer having flexure plates which are so arranged and dimensioned as to support the motor or other rotary machine in accurate alignment with the driven or drive equipment without objectionably impairing the sensitivity of the transducer in the measurement of relatively small torque inputs or outputs.

Still another object of this invention is to provide a novel adjustable stop means for preventing overdeflection of the housing of the rotary machine when rotated under the influence of the reaction torque.

The last mentioned object is accomplished by rigidly mounting a post in one of the transducer end plates so that its longitudinal axis is parallel to the rotational axis of the machine and by threading a screw or similar element into a bore at right angles to the post to provide a stop face which limits rotation of the housing in a predetermined direction.

A further object of this invention is to provide a novel construction for selectively adjusting the resistance of the transducer flexure plates to torque-induced rotation of the machine.

The last mentioned object is accomplished by clamping one or more of the flexure plates at either or both ends with metering blocks or plates which are adjustable longitudinally of the flexure plate to selectively alter its effective flexing length extending axially between the clamped regions.

Still a further object is to provide a novel reaction type torque transducer which is axially compact and which is a prefabricated unitary assembly requiring connection only to the housing of the rotary machine and to a stationary support surface. In this connection, the torque transducer of this invention is of such construction that it may conveniently be fully constructed and assembled as a single, easily transported unit for direct assembly on a rotary machine. Time and expense of installation at the site of the rotary machine are thereby minimized, and the preassembled transducer may be tested prior to delivery to the site of the installation.

Further objects of this invention will appear as the description proceeds in connection with the appended claims and the annexed drawings described below.

DESCRIPTION OF THE DRAWINGS

FIG. 1 is a right-hand side elevation showing one embodiment of this invention assembled with an electric motor;

FIG. 2 is a fragmentary top plan view of the assembly shown in FIG. 1;

FIG. 3 is a section taken substantially along lines 3-3 of FIG. 1 showing the assembly of the transducer and motor with the motor support plate removed;

FIG. 4 is a section taken substantially along lines 4-4 of FIG. 1;

FIG. 5 is a section taken substantially along lines 5-5 of FIG. 4;

FIGS. 6, 7, and 8 are sections taken respectively along lines 6-6, 7-7, and 8-8 of FIG. 3;

FIG. 9 is a perspective view of one of the metering blocks or plates which is shown in FIG. 3 for adjusting the effective flexure length of the upper and lower flexure plates;

FIG. 10 is a fragmentary left-hand side elevation of the assembly shown in FIG. 1 and illustrating the torque signal producing device with its front cover removed;

FIG. 11 is a fragmentary side elevation of a modified torque transducer construction;

FIG. 12 is a front elevation of the assembly shown in FIG. 11;

FIG. 13 is a section taken substantially along lines 13-13 of FIG. 12;

FIG. 14 is a fragmentary side elevation of still another torque transducer embodiment of this invention; and FIG. 15 is a front elevation of the assembly shown in FIG. 14.

DETAILED DESCRIPTION

In a typical arrangement, one embodiment of the torque transducer of this invention is shown in FIG. 1 for measuring the output torque of an electric motor 20. The torque transducer is generally indicated at 22 in FIG. 1 and is a reaction type torque sensor which measures the motor armature torque. As will hereinafter become apparent this torque measurement is attained without loading motor 20.

As shown in FIGS. 1—3, transducer 22 comprises a pair of end plates 24 and 25 and a plurality of flat-sided flexure plates or beams of rectangular configuration, which extend axially between plates 24 and 25. In this embodiment there are four such flexure plates which are indicated at 26a, 26b, 26c, and 26d and which are formed from any suitable material such as tool steel.

Still referring to FIGS. 1 and 2, motor 20 is of conventional construction and comprises a cylindrical central housing section 28 and front and rear end bells or housing portions which are respectively indicated at 30 and 31. The motor armature shaft which projects through a bore in end bell 30 is indicated at 32.

End plate 24 is rigidly fixed to end bell 30 by machine screws 34 (FIG. 4). End plate 25 is spaced forwardly of plate 24 in parallel relation thereto and is rigidly fixed to a rigid structural support plate 36 or the like by any suitable means such as machine screws indicated at 38 in FIG. 3. Support plate 36 may form a part of a frame structure or casing of the unshown device or machine driven by motor 20 and is securely fixed against movement by suitable means not shown in the drawings.

Armature shaft 32 extends coaxially and freely through axially aligned bores or apertures 40 (see FIG. 4) and 42 (see FIG. 3) which are respectively formed centrally in end plates 24 and 25. Shaft 32 or a coupled extension thereof extends freely through a bore 44 for connection to the motor driven device or machine. Bore 44 is formed in support plate 36 and axially aligns with apertures 40 and 42.

As shown in FIGS. 1 and 2, transducer 22 is interposed between support plate 36 and the housing of motor 20. Oppositely directed faces of end plates 24 and 25 respectively seat against opposing faces of end bell 30 and support plate 36. As will be described in detail shortly, flexure plates 26a, 26b, 26c, and 26d are mounted in cantilever fashion on end plate 25, and the assembly of end plate 24 and motor 20 are supported solely from the unsupported ends of flexure plates 26a, 26b, 26c, and 26d.

As best shown in FIG. 3, end plate 25 is formed with four peripheral flexure plate-receiving notches 46, 47, 48 and 49, which are equiangularly spaced 90 degrees apart about the circumference of the plate. Each notch is delimited and defined by intersecting mutually perpendicular straight edge surfaces 50 and 51. The edge surfaces 50 of notches 46 and 48 are contained in a common plate that is slightly offset laterally from a parallel, radial plane containing the rotational axis of armature shaft 32. Likewise, edge surfaces 50 of notches 47 and 49 are contained in a common plane which is parallel to and slightly laterally offset from a radial plane containing the armature shaft rotational axis. The plane containing the edge surfaces 50 of notches 46 and 48 perpendicularly intersects the plane containing the edge surfaces 50 of notches 47 and 49.

Still referring to FIG. 3, the edge surface 51 of notches 47 and 49 are parallel with the edge surfaces 50 of notches 46 and 48. The edge surfaces 51 of notches 46 and 48 are parallel with the edge surfaces 50 of notches 47 and 49.

With continued reference to FIG. 3, edge surfaces 51 of notches 46 and 48 are parallel and perpendicularly intersect a common radial plane containing the rotational axis of armature shaft 32. Similarly, the edge surfaces 51 of notches 47 and 49 are parallel and normally intersect a common radial plane containing the rotational axis of shaft 32. From the foregoing it is clear that edge surfaces 51 are contained in planes which extend tangentially of shaft 32 and which are each perpendicularly intersected by planes containing the associated edge surfaces 50 and extending radially of shaft 32.

Still referring to FIG. 3, corresponding ends of two of the flexure plates 26a and 26c are respectively received in notches 46 and 48 with their flat sides interfittingly seated on edge surfaces 50 and with their opposed side edges seated against edge surfaces 51. Each of the plates 26a and 26c is securely clamped between its associated edge surface 50 and a flat-sided, rectangularly shaped clamping block 56 by a machine screw 57 which extends through axially aligned cylindrically smooth bores in block 56 and the flexure plate and which is threaded into an aligning tapped bore indicated at 58 in FIG. 3. The bores 58 receiving screws 57 are formed in end plate 25 along parallel axes which are perpendicular to a plane extending radially of and containing the rotational axis of shaft 32. Blocks 56 are of the same width as flexure plates 26a and 26c, interfittingly seat against plates 26a and 26c, and have opposed straight side edge surfaces which seat against edge surfaces 51.

With continuing reference to FIG. 3, the corresponding ends of the flexure plates 26b and 26d are respectively received in notches 47 and 49 and each is securely clamped between a pair of flat-sided metering blocks or plates 62 and 63 by an assembly comprising a clamping block 64 and a machine screw 66. Screw 66 extends through aligned bores in blocks 64, 63, and 62 and is threaded into a tapped bore indicated at 68. Bores 68 are formed in plate 25 along parallel axes that are normal to the axes of bores 58 and to a radial plane containing the rotational axis of shaft 32.

The oppositely facing flat sides of metering block 62 interfittingly seat against the associated flexure plate and associated edge surface 50. The oppositely facing flat sides of each metering block 63 interfittingly seat against the associated flexure plate and clamping block 64. Corresponding edge surfaces of blocks 62—64 seat against their associated edge surfaces 51. The width of blocks 62—64 are equal to that of flexure plates 26b and 26d.

From the foregoing it is clear that flexure plates 26a, 26b, 26c and 26d are supported in cantilever fashion from end plate 25. End plate 24 is supported solely from the free ends of plates 26a, 26b, 26c and 26d in a manner now to be explained.

As shown in FIG. 4, end plate 24 is formed at its periphery with a series of four notches 70, 71, 72, and 73 which are identical to notches 46, 47, 48, and 49. Accordingly, like reference numerals have been supplied to designate like edge surfaces of notches 70—73.

As shown, the edge surfaces 50 of each corresponding pair of notches 46 and 70, 47 and 71, 48 and 72, and 49 and 73 are axially aligned. The edge surfaces 51 of notches 70—73 however, extend in directions that are opposite to the corresponding edge surfaces of notches 46—49 respectively.

The free, unsupported ends of flexure plates 26a, 26b, 26c and 26d are respectively received in notches 70, 71, 72, and 73 and are fixed to plate 24 by clamping arrangements which are the same as those just described for clamping the opposite ends of the flexure plates to end plate 25. Accordingly, like reference numerals suffixed by the letter *a* have been applied to designate like parts of the clamping assemblies which secure the unsupported ends of flexure plates 26a, 26b, 26c and 26d to end plate 24.

From the foregoing it is clear that the frame or housing of motor 20 is supported from support plate 36 solely by the assembly of flexure plates 26a, 26b, 26c and 26d and end plates 24 and 25 which is interposed between support plate 36 and end bell 30.

As shown, flexure plates 26a, 26b, 26c and 26d are parallel and each face edgewise toward the rotational axis of shaft 32 such that each flexure plate is medially intersected edgewise by a radial plane containing the rotational armature shaft axis. In this embodiment, flexure plates 26a and 26c are contained in a common plane which is perpendicularly intersected at the center of shaft 32 by a plane containing flexure plates 26b and 26d. Plates 26a, 26b, 26c, and 26d are disposed symmetrically about the axis of shaft 32 and are positioned at equal radial distances from the armature shaft axis. Plates 26a, 26b, 26c and 26d are each elongated in a direction extending parallel to the rotational axis of shaft 32 such that their major, longitudinal flexure axes are all parallel to the rotational axis of shaft 32 when the flexure plates are in their illustrated unflexed positions. When unflexed, each flexure plate 26a, 26b, 26c and 26d is connnected to end plates 24 and 25 at points which lie on a straight line extending parallel to the armature shaft rotational axis.

When the motor armature is turning during operation of motor 20, a reaction or countertorque is produced and applied to the motor housing and other parts which are fixed thereto. Plates 26a, 26b, 26c and 26d flex and twist under the influence of this reaction torque to allow the motor housing and end plate 24 to rotate relative to plate 25 about the axis of shaft 32. Since the reaction torque applied to the motor housing and end plate 24 is proportional to the torque output of motor 20, then the angle through which end plate 24 is rotated relative to end plate 25 is proportionately related to the torque output of motor 20. The measurement of relative rotation between end plates 24 and 25 will be described later on.

From the foregoing description it will be appreciated that flexure plates 26a, 26b, 26c and 26d perform two functions. First, they support motor 20 from support plate 36. Second, they allow the reaction torque to turn end plate 24 relative to end plate 25 to thus provide a measurement of the torque output.

One major advantage derived from positioning flexure plates 26a, 26b, 26c and 26d edgewise toward the rotational axis of shaft 32 is the resulting stiffness that is achieved for supporting motor 20 without impairing the sensitivity of torque transducer 22. In this connection, the stiffness of each of the flexure plates 26a, 26b, 26c and 26d is, owing to the cantilever effect, essentially proportional to the cube of its thickness in the direction of flexure, to its width in the direction of flexure, and to the reciprocal of the cube of its length in the direction of flexure. Since the flexure plates are positioned edgewise toward the armature shaft axis, the stiffness of plates 26b and 26d for supporting motor 20 will be proportional to the cubic of the actual width of each of the flexure plates 26b and 26d when motor 20 is horizontally positioned as shown in FIG. 1. This means that if the actual width of flexure plates 26b and 26d is doubled, plates 26b and 26d become eight times as stiff. If, on the other hand, plates 26b and 26d were mounted with their sides facing the armature shaft axis and the width were doubled, plates 26b and 26d would only become twice as stiff. Thus, for the flexure plate orientation illustrated in FIGS. 1—4, the actual thickness of the flexure plates may therefore be relatively small to thereby reduce the resistance to rotation of end plate 24 by the reaction torque.

For an arrangement in which motor 20 is horizontally supported at the unsupported ends of flexure plates 26a, 26b, 26c and 26d, plates 26b and 26d support most of the motor load, with plate 26b being in tension and plate 26d being in compression. With such an arrangement, flexure plates 26a and 26c, which are located at the sides act more as stabilizers. For the illustrated arrangement wherein the axis of armature shaft 32 is horizontal it is important to locate at least one of the flexure plates in a radial plane that is vertical. This flexure plate orientation makes maximum use of the flexure plate stiffness which is attributable to the width of the flexure plate.

For cantilevered, horizontal motor orientation shown in FIG. 1, a stiff support is very important to prevent misalignment between shaft 32 and the motor driven equipment which may be a driven shaft or some other motion transmitting part. At the same time, the relatively stiff support must not impair the sensitivity of the transducer 22 if the torque of motor 20 is to be accurately measured. The arrangement shown in FIGS. 1—4 achieves both of these objectives in addition to providing a uniquely simplified motor support that may be incorporated into an existing installation. More specifically, it was found that for the arrangement of flexure plates 26a, 26b, 26c and 26d shown in FIGS. 1—4, end plate 24 will rotate very accurately about the rotational axis of shaft 32 without offering such resistance to rotation of end plate 24 as to objectionably impair the sensitivity of transducer 22. This flexure plate arrangement in addition to preventing any significant vertical motion also precludes any significant sideward or radial motion of the assembly of end plate 24 and motor 20.

The lengths, thicknesses, and widths of the top and bottom flexure plates 26b and 26d are preferably the same and these flexure plates are also preferably made from the same material. Likewise, the side-oriented flexure plates 26a and 26c are preferably identical in dimensions and construction, but they need not necessarily be of the same dimensions or made from the same materials as the top and bottom flexure plates 26a and 26c.

In general, flexure plates 26a, 26b, 26c and 26d are made as wide as is practical so that their thicknesses can be reduced to allow them to flex and twist more easily and thus offer minimal resistance to rotation of end plate 24. For the embodiment shown in FIGS. 1—4 it was found that end plate 24 could be rotated with minimal resistance through ten minutes of arc and that this magnitude of rotation was sufficient to provide accurate measurements of relatively small torques.

By virtue of arranging flexure plates 26a, 26b, 26c and 26d in the manner shown in FIGS. 1—4, the torque transducer of this invention measures only tangentially applied forces and is substantially insensitive to radially applied loads. As a consequence, no undesirable forces are imparted to cause premature wear or breakdown of the drive connecting means (not shown) such as belt and pulley assemblies, as well as gears or other direct drives, which may be used for connecting shaft 32 to the unshown driven equipment. Also, by virtue of the cantilever support of motor 20, the torque transducer is relatively insensitive to temperature variations.

With the torque transducer shown in FIGS. 1—4, it is possible to measure torque in either direction. As a result, the regenerative braking effect could be measured if desired. Furthermore, the torque transducer shown in FIGS. 1—4 is axially compact owing particularly to the relatively short lengths of flexure plates 26a, 26b, 26c and 26d. As a result, additional parts, such as shaft-lengthening couplings and the like are usually not required in assembling torque transducer 22 with an off-the-shelf, commercially available motor or other rotary machine.

Such off-the-shelf motors or other rotary machines usually have some type of end face mounting means such as an annular, axially projecting boss or flange indicated at 80 in FIG. 8. Flange 80 in this embodiment is integral with or suitably fixed to the front end face of end bell 30 in concentric relation with shaft 32. Normally, in absence of transducer 22, flange 80 is adapted to seat with a piloting fit in a complementary cylindrical recess 82 which is formed in support plate 36. With such a mounting arrangement, unshown machine screws or the like are adapted to extend through bores 84 in plate 36 and to be threaded into aligning bores 86 (see FIG. 5) in end bell 30 to securely mount motor 20 on plate 36. The assembly of torque transducer 22 with a mounting arrangement will now be described.

As best shown in FIG. 8, end plate 25 is formed with an annular mounting boss or flange 88, the outer diameter and axial length of which are substantially the same as that of flange 80. Flange 88 is coaxially seated with a piloting fit in recess 82. End plate 24 is formed with a complementary cylindrical recess 90 which has substantially the same axial depth and outer diameter as recess 82 and which coaxially receives flange 80 with a piloting fit. Recess 90 and flange 88 are axially aligned. Screws 34 are threaded into bores 86 to mount motor 20 on end plate 24.

From the foregoing it is clear that no modification of motor 20 is required for assembling transducer 22 therewith. It will also be appreciated that for the foregoing standard motor mounting construction, transducer 22 may quickly and easily be incorporated into an existing installation with no significant modification of the existing structure. In this connection, motor 20 need only be removed from its normal mounted position on support plate 36 and mounted on end plate 24. The assembly of motor 20 and transducer then may suitably be secured to support plate 36. Of course, the sequence of assembly of the motor and transducer just described may be altered, depending upon the conditions encountered.

The piloting fit of flange 80 in recess 90 also ensures accurate alignment between shaft 32 and transducer 22. It also will be appreciated that in place of the facing mounting arrangement of transducer 22 on support plate 36, a foot mounting structure (not shown) may be secured to the floor and end plate 25 may be secured to the foot mounting structure.

Referring to FIGS. 4 and 8, an electrical signal producing device 100 is operatively connected to end plate 24 for developing an electrical signal which is proportional in amplitude to the angle through which end plate 24 is rotated relative to end plate 25. Device 100 is essentially the same as the one shown and described in U.S. Letters Pat. No. 3,358,502 issued on Dec. 19, 1967 for "Force Measuring Instrument."

As shown in FIG. 8, device 100 comprises a differential transformer 102 having a winding 104 and a core 106. Core 106 is mounted for displacement coaxially within winding 104 to vary the magnitude of the voltage across the terminals of winding 104.

Core 106 is connected by a motion transmitting linkage 110 to an arm 112 which is fixed to end plate 24 as best shown in FIG. 4. Linkage 110, which supports core 106, is preferably the same as that described in U.S. Pat. No. 3,358,502, identified above.

Winding 104, as shown in FIG. 8, is fixed in a suitable casing 113 which has a cover 114 (FIG. 4). Linkage 110 extends through an aperture in casing 113 and into the interior thereof. A bellows 116 may be provided around this aperture to prevent the entry of dirt or other foreign matter into casing 113. Casing 113 is mounted on an arm 118 which is secured to end plate 25 by screws indicated at 120 in FIG. 3.

From the foregoing description it is clear that device 100 converts the rotational motion of end plate 24 into electrical signal which is proportional in amplitude to the angle through which end plate 24 is rotated by the reaction torque. This electrical signal may be applied to any form of signal utilization device such as, for example, a readout device which indicates the measured torque output of motor 20.

Advantageously, a damping device indicated at 122 in FIGS. 3 and 4 is provided to smooth out vibrations that may occur particularly when there is a full or partial release of the load on motor 20. Damping device 122 preferably is essentially the same as the damping device which is contained in the first embodiment shown and described in U.S. Letters Pat. No. 3,354,710 issued on Nov. 28, 1967 for "Force Measuring Instrument." As shown, damping device 122 comprises a casing 124 which is fixed to end plate 25 and which slidably houses an unshown piston that is connected to a piston rod 126. Rod 126 is connected by a motion transmitting arm 128 to end plate 24 to dampen the rotational motion of end plate 24.

As shown in FIGS. 8 and 9, the apertures which are formed in blocks 62, 63, 62a and 63a for receiving screws 66 and 66a are indicated at 132 and are elongated longitudinally of flexure plates 26b and 26d. By virtue of this construction, the longitudinal flexure zone extending between the clamped regions of flexure plate 26b may selectively be adjusted by loosening either or both of the associated screws 66 and 66a and by longitudinally sliding either or both sets of the associated blocks 62, 63, 62a and 63a which are disposed at the opposite ends of plate 26b. The screws are then retightened to securely clamp the adjusted blocks in their new positions.

If the longitudinal flexure zone of plate 26b is shortened by adjustment of the one set of blocks indicated at 62 and 63, or the other set of blocks indicated at 62a and 63a, or both sets, the stiffness of flexure plate 26b is correspondingly increased. If, on the other hand, the longitudinal flexure zone of flexure plate 26b is correspondingly increased the stiffness of plate 26b is correspondingly decreased. It therefore is clear that within the limits afforded by the elongation of apertures 132, the stiffness of flexure plate 26b may infinitely be varied.

The stiffness of flexure plate 26d may selectively be adjusted in the same manner explained in connection with flexure plate 26b, and the stiffness of plate 26b and 26d may be varied independently of each other. It therefore will be appreciated that the foregoing torque transducer construction affords a ready and simplified stiffness adjustment that can easily be manipulated.

As best shown in FIGS. 4 and 7, a post 136 is rigidly fixed at one end to end plate 24 and extends freely at its other end into an enlarged bore 138 in end plate 25. The longitudinal axis of post 136 is parallel to and spaced radially from the rotational axis of shaft 32. Bore 138 is made sufficiently large that post 136 does not engage the internal periphery of the bore during normal operating conditions. Bore 138 and aperture 42 are formed along parallel spaced apart axes.

As shown in FIG. 3, a machine screw 140 is threaded into a tapped bore 142 which is formed in end plate 25 and which perpendicularly intersects bore 138 such that the inner end of screw 140 projects radially into bore 138. The axis of bore 142 is parallel to a plane extending tangentially of shaft 32. With this construction, it will be appreciated that the inner end of screw 140 provides a stop face which is engageable by post 136 to limit rotation of end plate 24 and motor 20 in a counterclockwise direction as viewed from FIG. 3.

The arc through which the assembly of end plate 24 and motor 20 is rotatable in a counterclockwise direction may be adjusted by selectively threading screw 140 into or out of bore 142. A lock nut 144 (FIG. 3) is provided for locking screw 140 in its adjusted position.

A second assembly indicated at 146 (see FIG. 4) is also provided to limit rotation of end plate 24 and motor 20 in a counterclockwise direction as viewed from FIG. 3. Assembly 146 is identical to that of post 136, screw 140 and nut 144. Like reference numerals suffixed by the letter *a* have been applied to designate the corresponding parts of assembly 146.

As best shown in FIG. 2, post 136a is fixed at one end to end plate 25 and extends at its other end freely into an enlarged bore 148 which is formed in end plate 24 along an axis parallel to that of aperture 40. The axis of post 136a is parallel to and radially spaced from the rotational axis of shaft 32.

Screw 140a is threaded into a tapped bore 150 which normally intersects bore 148 and which is formed in end plate 24 along an axis that is parallel to a plane extending tangentially of shaft 32. The inner end of screw 140a projects radially into bore 148 and is abuttable with post 136a upon rotation of end plate 24 through a preselected arc. The adjustment of screws 136 and 136a is usually correlated such that both allow the same magnitude of rotation.

The stop limits afforded by screws 136 and 136a prevents damage to the equipment in the event of excessive torque or failure of one or more of the flexure plates 26a, 26b, 26c, or 26d.

As shown in FIGS. 3 and 4, each of the notches 46, 48, 70, and 72 is formed with an open ended, outwardly opening, shallow relief groove 156 at the intersection of edge surfaces 50 and 51. Each groove 156 extends the complete axial length of its associated end plate 24, 25 in parallel relation to the longitudinal axis of its associated flexure plate. The opposing longitudinally extending corner defined by an adjoining edge and flat side of each of the flexure plates 26a and 26c is received in the mouth of its associated groove 156. This relief groove construction enables each of the flexure plates 26a and 26c to seat snugly against edge surfaces 50 and 51 to thus prevent play and particularly sideward motion of each of the flexure plates 26a and 26c along the entire areas of its clamping regions where it seats against edge surface 50.

Similar relief grooves indicated at 158 preferably are also provided in notches 47, 49, 71 and 73 and receive the opposing corners of metering blocks 62 and 62a to prevent play of blocks 62 and 62a throughout the entire lengths of the clamping regions for flexure plates 26b and 26d. As a result, blocks 62 and 62a snugly seat in their respective notches, and flexure plates 26b and 26d are firmly clamped in place against blocks 62 and 62a throughout the entire opposing side areas of blocks 62 and 62a. Both grooves 156 and grooves 158 are relatively shallow and are enlarged in FIGS. 3 and 4 for illustrative purposes.

In the embodiment illustrated in FIGS. 11 and 12, end plates 24 and 25 are replaced with end plates 160 and 161 respectively. End plate 160 is generally similar in construction as compared with end plate 24 and is rigidly fixed and matingly seated against end bell 30 in the same manner described for end plate 24 in the previous embodiment. Like reference characters have been applied to designate like portions of end plates 160 and 24.

As best shown in FIG. 12, the corresponding ends of flexure plates 26a, 26b, 26c and 26d are each clamped between a pair of flat-sided blocks or plates 164 and 165. Block 164 is securely fixed to block 165 by machine screws indicated at 166, and block 165 is securely fixed to end plate 160 by machine screws 168.

End plate 161 is formed with an enlarged central aperture 169 (FIG. 12) through which end bell 30 freely and coaxially extends. The peripheral edge of aperture 169 is spaced radially from the casing of motor 20 so that there is no contact with the motor casing. With this construction it is clear that end plate 161 peripherally and concentrically surrounds end bell 30.

Flexure plates 26a, 26b, 26c and 26d extend rearwardly from end plate 160 and axially beyond end plate 161. The ends of flexure plates 26a, 26b, 26c and 26d projecting rearwardly of end plate 161 are each clamped between a pair of mating, flat-sided blocks or plates 172 and 173. Block 172 is securely fixed to block 173 by machine screws indicated at 174, and block 173 is securely fixed to the back side of end plate 161 by machine screws 176. As best shown in FIG. 11, flexure plate 26d extends freely through a slot 177 which is formed in the lower portion of end plate 161. Slot 177 is made wide enough and deep enough so that it is not contacted by flexure plate 26d when it is flexed during operation of motor 20.

Still referring to FIGS. 11 and 12, end plate 161 is spaced radially apart from the casing of motor 20 and is rigidly fixed to a stationary baseplate 178 by any suitable means such as brackets indicated at 180. Baseplate 178 is fixed to a floor or other support surface.

In the embodiment shown in FIGS. 11 and 12, the orientation of flexure plates 26a, 26b, 26c and 26d is the same as that described in the previous embodiment except that in the embodiment of FIGS. 11 and 12 flexure plates 26a, 26b, 26c and 26d instead of extending forwardly, extend rearwardly from end plate 160 which is fixed to the casing of motor 20. This modified construction provides a torque transducer unit which is axially more compact as compared with the embodiment shown in FIGS. 1—10. The modified torque transducer shown in FIGS. 11 and 12 is therefore advantageous for assembly with motors or other rotary machines having relatively short drive or driven shafts and also for installations in which the available axial spacing between the motor and other structure is comparatively small.

As best shown in FIG. 13, a modified stop construction is provided for and comprises a post 180 threaded into a bore 182 which is formed in plate 161 along an axis extending parallel to that of shaft 32. The opposite end of post 180 extends coaxially and freely into an enlarged bore 184 which is formed in end plate 160 along an axis that is parallel to that of aperture 40 and shaft 32. A rigid U-shaped member 186, which is fixed to end plate 160 has a pair of parallel arms 188 (see FIG. 12) which are disposed on diametrically opposite sides of and in spaced relation to the portion of post 180 extending axially between end plates 160 and 161.

Still referring to FIG. 13, a pair of stop screws 190 are threaded into axially aligned, tapped bores which are formed through arms 188 along an axis radially intersecting that of post 180. Rotational displacement of end plate 160 and, consequently, the housing of motor 20 are limited in a clockwise direction by abutment of post 180 with one of the screws 190 and in a counterclockwise direction by abutment of post 180 with the other screw. By threading screws 190 into or out of their respective bores, the maximum angle through which end plate 160 is rotatable in one direction or the other may selectively be varied.

A second stop assembly is generally indicated at 192 in FIG. 12. This stop assembly is the same as one comprising post 180, member 186 and screws 190. Accordingly, like reference numerals have been applied to designate like parts of assembly 192.

In the embodiment shown in FIGS. 11 and 12 it is clear that flexure plates 26a, 26b, 26c and 26d are mounted in cantilever fashion on end plate 161 and extend forwardly from end plate 161 to regions in the proximity of the front face of end bell 30. End plate 160 is fixed to the forward unsupported ends of flexure plates 26a, 26b, 26c and 26d so that the assembly of motor 20 and end plate 160 is supported from the free or unsupported ends of flexure plates 26a, 26b, 26c and 26d as best shown in FIG. 11.

As shown in FIG. 13, each post 180 of the two limit stop assemblies comprises a bolt having a head 193 which is received in a diametrically enlarged section 194 of bore 184. Between head 193 and the bottom wall 195 of bore section 194 a disc 196 is coaxially mounted on post 180. In the event that all of the flexure plates 26a, 26b, 26c and 26d fail, the assembly of motor 20 and plate 160 will be supported on post 180 and will be prevented from sliding off of post 180 by engagement of disc 196 with wall 195.

The modified embodiment illustrated in FIGS. 14 and 15 is somewhat similar to the transducer construction shown in FIGS. 11—13, particularly in that one of the transducer end plates indicated at 200 is centrally formed with an aperture 201 (see FIG.15) which coaxially receives end bell 30. Thus, end plate 200 peripherally surrounds the casing of motor 20 as shown.

In the embodiment shown in FIGS. 14 and 15, however, end plate 200, which is in peripheral surrounding relation to the motor casing, is fixed by a support base 204 to a foot mount 206 which forms a part of or is rigid with the casing of motor 20. As shown in FIG. 14, the foot mount 206 of the motor casing is securely fixed to support base 204 by machine screws 208, and support base 204, which extends beneath motor 20, is securely fixed to end plate 200 by screws indicated at 210 at the forward end of motor 20.

Still referring to FIG. 14, the corresponding ends of flexure plates 26a, 26b, 26c and 26d are each clamped between a pair of flat-sided clamping blocks or plates 212 and 214. Block 212 is securely fixed to block 214 by screws (one shown) indicated at 216, and block 214 is securely fixed to end plate 200 by screws indicated at 218.

As best shown in FIG. 14, flexure plates 26a, 26b, 26c and 26d extend axially forwardly from end plate 200 and freely through enlarged slots 222 which are formed in the second end plate indicated at 224. Slots 222 are wide enough and deep enough so that flexure plates 26a, 26b, 26c and 26d upon being flexed by operation of motor 20 do not contact the side edges or bottoms of the slots.

The forward ends of flexure plates 26a, 26b, 26c and 26d extend axially beyond end plate 224 and are each clamped between a pair of flat-sided clamping blocks or plates 226 and 228. Block 226, as best shown in FIG. 15, is securely fixed to block 228 by machine screws indicated at 230, and block 228 is securely fixed to end plate 224 by machine screws 232.

Flexure plates 26a, 26b, 26c and 26d extend axially between end plates 200 and 224 and are oriented in the same manner as described in the first embodiment herein. End plate 224 is spaced axially forward of and in alignment with end plate 200 as well as being spaced slightly axially forwardly in spaced relation to the front face of end bell 30.

Still referring to FIGS. 14 and 15, end plate 224 is formed with a central aperture 236 through which shaft 32 coaxially and freely extends. End plate 224 is rigidly fixed to a support base 238 by suitable means such as brackets indicated at 240. Support base 238 is adapted to be securely fixed to a floor or other support surface.

From the foregoing description it is clear that flexure plates 26a, 26b, 26c and 26d are mounted in cantilever fashion on end plate 224. The assembly of motor 20 and end plate 200 is supported at the unsupported ends of flexure plates 26a, 26b, 26c and 26d which extend axially rearwardly of end plate 224.

The adjustable stop assemblies indicated at 242 and 244 for limiting rotation of the assembly of the motor casing and end plate 200 in either direction are of the same construction as those shown in FIGS. 11 and 13. Accordingly, like reference numerals have been applied to designate like parts of assemblies 242 and 244. In the embodiment of FIGS. 14 and 15, the members 186 of assemblies 242 and 244 are fixed to end plate 200, and the posts 180 of assemblies 242 and 244 are fixed to end plate 224 and extend freely into bores (not shown) formed in end plate 200.

The torque transducer construction shown in FIGS. 14 and 15 may be employed in axially compact spaces and is readily and easily adaptable to off-the-shelf motors or other rotary machines having the conventional type of foot mount 206 as shown.

In the modification shown in FIGS. 11 and 12 and also in the modification shown in FIGS. 14 and 15, parts corresponding to those in the embodiment of FIGS. 1—10 have been designated by the same reference characters.

During operation of motor 20, the motor parts will heat up while the previously described motor support bases remain relatively cool. The difference in expansion because of this temperature difference is often considerable, and the resulting forces are correspondingly great. Relative expansion between the assembly of the motor armature (not shown) and the armature shaft and the assembly of the motor stator (not shown) and housing is accommodated in conventional motor constructions and similar rotary machines by allowing one end of the motor armature shaft to axially slide back and forth through the bearing (not shown) at one end. The torque transducers of this invention are so constructed and assembled with motor 20 as to allow shaft 32 to axially slide back and forth to the extent permitted by the motor construction. In this respect, therefore, no objectionable forces are developed that would interfere with the torque-induced deflection of flexure plates 26a, 26b, 26c and 26d. It will be noted that this effect is achieved particularly by supporting motor 20 in cantilever fashion only at the free ends of flexure plates 26a, 26b, 26c and 26d and by extending shaft 32 freely through the support plates indicated at 24 and 25 in FIG. 1.

Furthermore, by mounting flexure plates 26a, 26b, 26c and 26d in cantilever fashion and by supporting motor 20 only from the free, unsupported ends of flexure plates 26a, 26b, 26c and 26d, the motor housing and the assembly of flexure plates 26a, 26b, 26c and 26d are free to axially expand and contract relative to each other without creating any objectionable forces that would interfere with the torque-induced deflection of plates 26a, 26b, 26c and 26d. Temperature variations will, therefore, have no significant effect upon the accuracy of the torque measurements obtained with the torque transducers of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to be secured by Letters Patent is:

1. A torque transducer for measuring torque input or output of a rotary machine and comprising first and second mounting plate members spaced axially apart in parallel relation along the rotational axis of said machine, said first plate being adapted to be rigidly fixed to the housing of said machine, and said second plate member being adapted to be rigidly fixed to a stationary support surface to prevent rotation thereof with said first plate member about said rotational axis, a plurality of flexure beams extending axially between and secured at opposite ends to said first and second plate members, said flexure beams being mounted in cantilever fashion on said second plate member and providing the sole support for the assembly of said first plate member and said machine at their unsupported ends, said beams being flexed under the influence of the reaction torque applied to said housing during operation of said machine to provide for the reaction torque-induced rotation of said assembly about said rotational axis and relative to said second plate member, and means operatively connected to said first plate member for producing a signal representative of the angle through which said first plate member is rotated relative to said second plate member, said flexure beams being oriented about said rotational axis to maintain rotation of said assembly substantially coaxial with said rotational axis, with at least one of said beams being flat-sided and facing edgewise radially toward said rotational axis, said one beam being medially intersected by a plane containing said rotational axis and being vertically disposed when said rotational axis is horizontally oriented, said rotary machine having an energy transferring shaft extending from said housing, and at least one of said mounting plate members being provided with a central aperture through which said shaft is adapted to coaxially and freely extend.

2. A torque transducer for measuring torque input or output of a rotary machine and comprising first and second mounting plate members spaced axially apart in parallel relation along the rotational axis of said machine, said first plate being adapted to be rigidly fixed to the housing of said machine, and said second plate member being adapted to be rigidly fixed to a stationary support surface to prevent rotation thereof with said first plate member about said rotational axis, a plurality of flexure beams extending axially between and secured at opposite ends to said first and second plate members, said flexure beams being mounted in cantilever fashion on said second plate member and providing the sole support for the assembly of said first plate member and said machine at their unsupported ends, said beams being flexed under the influence of the reaction torque applied to said housing during operation of said machine to provide for the reaction torque-induced rotation of said assembly about said rotational axis and relative to said second plate member, and means operatively connected to said first plate member for producing a signal representative of the angle through which said first plate member is rotated relative to said second plate member, said flexure beams being oriented about said rotational axis to maintain rotation of said assembly substantially coaxial with said rotational axis, with at least one of said beams being flat-sided and facing edgewise radially toward said rotational axis, said one beam being medially intersected by a plane containing said rotational axis and being vertically disposed when said rotational axis is horizontally oriented, said first plate member being configured and disposed to mate with and seat against an opposing, axially directed end face of said housing.

3. The torque transducer defined in claim 2 wherein said machine has an energy-transferring shaft projecting from said housing and wherein said first plate member is formed with a central aperture through which said shaft is adapted to coaxially and freely extend.

4. The torque transducer defined in claim 2 wherein said machine has an energy-transferring shaft extending from said housing, and wherein said first and second plate members are formed with axially aligned, central apertures which said shaft is adapted to coaxially and freely extend.

5. A torque transducer for measuring torque input or output of a rotary machine and comprising first and second mounting plate members spaced axially apart in parallel relation along the rotational axis of said machine, said first plate being adapted to be rigidly fixed to the housing of said machine, and said second plate member being adapted to be rigidly fixed to a stationary support surface to prevent rotation thereof with said first plate member about said rotational axis, a plurality of flexure beams extending axially between and secured at opposite ends to said first and second plate members, said flexure beams being mounted in cantilever fashion on said second plate member and providing the sole support for the assembly of said first plate member and said machine at their unsupported ends, said beams being flexed under the influence of the reaction torque applied to said housing during operation of said machine to provide for the reaction torque-induced rotation of said assembly about said rotational axis and relative to said second plate member, and means operatively connected to said first plate member for producing a signal representative of the angle through which said first plate member is rotated relative to said second plate member, said flexure beams being oriented about said rotational axis to maintain rotation of said assembly substantially coaxial with said rotational axis, with at least one of said beams being flat-sided and facing edgewise radially toward said rotational axis, said one beam being medially intersected by a plane containing said rotational axis and being vertically disposed when said rotational axis is horizontally oriented, said housing having an axially directed end face configured to mate with a mounting portion of said support surface to enable said machine to be mounted directly on said support surface, said first and second plate members being interposed axially between said end face and said mounting portion, and said first and second plate members having axially oppositely facing complementary surfaces respectively configured to mate with said end face and said mounting portion and respectively adapted to seat against said end face and said mounting portion in assembled relation with said machine and said support surface.

6. The torque transducer defined in claim 5 wherein said machine has an energy-transferring shaft extending from said housing and wherein said first and second plate members are formed with axially aligned, central apertures through which said shaft is adapted to coaxially and freely extend.

7. A torque transducer for measuring torque input or output of a rotary machine and comprising first and second mounting plate members spaced axially apart in parallel relation along the rotational axis of said machine, said first plate being adapted to be rigidly fixed to the housing of said machine, and said second plate member being adapted to be rigidly fixed to a stationary support surface to prevent rotation thereof with said first plate member about said rotational axis, a plurality of flexure beams extending axially between and secured at opposite ends to said first and second plate members, said flexure beams being mounted in cantilever fashion on said second plate member and providing the sole support for the assembly of said first plate member and said machine at their unsupported ends, said beams being flexed under the influence of the reaction torque applied to said housing during operation of said machine to provide for the reaction torque-induced rotation of said assembly about said rotational axis and relative to said second plate member, and means operatively connected to said first plate member for producing a signal representative of the angle through which said first plate member is rotated relative to said second plate member, said flexure beams being oriented about said rotational axis to maintain rotation of said assembly substantially coaxial with said rotational axis, with at least one of said beams being flat-sided and facing edgewise radially toward said rotational axis, said one beam being medially intersected by a plane containing said rotational axis and being vertically disposed when said rotational axis is horizontally oriented, one of said plate members being of annular configuration and peripherally surrounding said housing in assembled relation therewith.

8. The torque transducer defined in claim 7 wherein said one plate member is said second plate member.

9. The torque transducer defined in claim 7 wherein said one plate member is said first plate member.

10. A torque transducer for measuring torque input or output of a rotary machine and comprising first and second mounting plate members spaced axially apart in parallel relation along the rotational axis of said machine, said first plate being adapted to be rigidly fixed to the housing of said machine, and said second plate member being adapted to be rigidly fixed to a stationary support surface to prevent rotation thereof with said first plate member about said rotational axis, a plurality of flexure beams extending axially between and secured at opposite ends to said first and second plate members, said flexure beams being mounted in cantilever fashion on said second plate member and providing the sole support for the assembly of said first plate member and said machine at their unsupported ends, said beams being flexed under the influence of the reaction torque applied to said housing during operation of said machine to provide for the reaction torque-induced rotation of said assembly about said rotational axis and relative to said second plate member, means operatively connected to said first plate member for producing a signal representative of the angle through which said first plate member is rotated relative to said second plate member, said flexure beams being oriented about said rotational axis to maintain rotation of said assembly substantially coaxial with said rotational axis, with at least one of said beams being flat-sided and facing edgewise radially toward said rotational axis, said one beam being medially intersected by a plane containing said rotational axis and being vertically disposed when said rotational axis is horizontally oriented, and means for selectively adjusting the effective axial length of flexure of at least one of said flexure beams.

11. A torque transducer for measuring the torque input or output of a rotary machine and comprising first and second mounting plate members spaced axially apart along the rotational axis of said machine, said first plate member being rigidly fixed to the housing of said machine and said second plate member being secured against rotation with said housing, flexure beam means interconnecting said first and second plate members and providing for rotational motion of said machine and said first member relative to said second plate member by the reaction torque applied during operation of said machine, and means for measuring the rotation of said first plate member relative to said second plate member, said second plate member being of annular configuration and peripherally surrounding said housing.

12. A torque transducer for measuring the torque input or output of a rotary machine having a housing rotatably supporting an energy-transferring shaft, said torque transducer comprising first and second mounting plates spaced axially apart along the rotational axis of said shaft, said first plate being adapted to be rigidly fixed to said housing, and said second plate being adapted to be rigidly fixed to a stationary support to prevent rotation thereof with said first plate about said rotational axis, a plurality of flexure beams extending axially between and rigidly secured at opposite ends to said first and second plates, said flexure beams being mounted in cantilever fashion on said second plate and providing the sole support for the assembly of said first plate and said machine at their unsupported ends, said beams being flexed under the influence of the reaction torque applied to said housing during operation of said machine to provide for the reaction torque-induced rotation of said assembly about said rotational axis and relative to said second plate, and means operatively connected to said first plate for producing a signal representative of the angle through said first plate is rotated relative to said second plate, at least one of said first and second plates having a central aperture through which said shaft coaxially and freely extends.

13. The torque transducer defined in claim 12 wherein the other of said first and second plates also has a central aperture through which said shaft coaxially and freely extends.

14. The torque transducer defined in claim 13 wherein said support has a mounting portion axially facing an end face of said housing, wherein said end face is configured to mate with said mounting portion, wherein said first and second plates are disposed in assembled relation axially between said end face and said mounting portion, and wherein said first and second plates have axially oppositely facing mounting surfaces configured and disposed to respectively mate with and seat against said end face and said mounting portion.

15. The torque transducer defined in claim 12 wherein each of said plates is formed with a plurality of peripheral notches receiving corresponding ends of said flexure beams, with each notch being delimited by a pair of perpendicularly joined edge surfaces respectively extending parallel to planes disposed radially and tangentially of said shaft, and wherein means are provided for clamping the ends of said beams in their respective notches.

16. The torque transducer defined in claim 15 wherein the clamping means for at least one of said flexure beams comprises at each end thereof plate means fixed to the associated mounting plate and rigidly clamping the associated flexure beam end in place within its associated notch, and means for selectively adjusting the position of said plate means longitudinally of said one beam to vary the flexure length of the beam between the clamped regions at opposite ends thereof.

17. The torque transducer defined in claim 15 wherein corresponding notches in said first and second plates receiving at least one of said flexure beams are each formed with an axially extending relief groove at the intersection of said perpendicularly joined edge surfaces, wherein said one beam has a flat side seated against one of said edge surfaces and a straight edge perpendicularly joined to said flat side and seated against the other of said edge surfaces, the corner defined by said flat side and said edge being disposed at the mouth of said groove in parallel relation thereto.

18. The torque transducer defined in claim 12 wherein said flexure beams are spaced in parallel relation equidistantly around said rotational axis, wherein said beams are flat-sided, with each beam having an edge facing radially toward said rotational axis and medially intersected by a radial plane containing said rotational axis, and wherein the points of attachment of each beam to said first and second plate members lie on a line extending parallel to said rotational axis.

19. The torque transducer defined in claim 12 comprising a post fixed to one of said first and second mounting plates and extending along an axis that is parallel to said rotational axis, means providing a tapped bore in the other of said mounting plates along an axis normally intersecting the axis of said post, and an element threaded into said bore and having an end face which is abuttable with said post to limit rotation of said assembly to a predetermined angle, said element being selectively axially displaceable along the axis of said bore to selectively adjust the magnitude of said predetermined angle.

20. A torque transducer measuring the torque input or output of a rotary machine and comprising first and second mounting plates spaced axially apart along the rotational axis of said machine, said first plate being rigidly fixed to the housing of said machine, and said second plate being secured against rotation with said housing, flexure beam means interconnecting said first and second plates and being deflectable to provide for rotational motion of the assembly of said machine and said first plate about said axis by the reaction torque applied to said housing during operation of said machine, means for measuring the rotation of said first plate relative to said second plate, and stop abutment means comprising coacting elements mounted on said first and second plates for limiting rotation of said assembly at least in one predetermined direction, one of said elements being selectively adjustable relative to the other of said elements for selectively varying the magnitude of the angle through which said assembly is rotatable in said predetermined direction.

21. The torque transducer defined in claim 20 wherein said flexure beam means comprises a plurality of flexure beams mounted in cantilever fashion on said second plate, wherein said assembly is supported solely from the free ends of said beams, wherein one of said elements comprises a post for supporting said assembly in the event of structural failure of said beams, and wherein means coacting with said post limits axial displacement of said assembly when supported by said post.

22. A torque transducer for measuring the torque input or output of a rotary machine having a housing and an energy transferring shaft extending from said housing, said torque transducer comprising first and second mounting plate members spaced axially apart along a rotational axis of said machine, said first plate member being rigidly fixed to said housing of said machine and said second plate member being secured against rotation with said housing, flexure means interconnecting said first and second plate members and providing for rotational motion of the assembly of said machine and said first member about said axis and relative to said second plate member by the reaction torque applied to said housing during operation of said machine, and means for measuring the rotation of said first plate member relative to said second plate member, at least one of said plate members having an aperture through which said shaft freely extends.

23. The force transducer defined in claim 22 wherein said flexure means comprises a plurality of angularly spaced apart beams extending longitudinally of said axis and being fixed to said first and second plate members to support the assembly of said first plate member and said machine in cantilever fashion from said second plate member.

24. The force transducer defined in claim 23 wherein said shaft freely extends through apertures in both of said plate members.

25. The force transducer defined in claim 24 wherein said apertures are located centrally in both of said plate members and wherein said shaft extends coaxially through both of said apertures.

26. The force transducer defined in claim 23 wherein said one of said plate members is said second plate member.

27. The force transducer defined in claim 23 wherein said one of said plate members is said first plate member.

28. The torque transducer defined in claim 22 wherein said shaft coaxially extends through said aperture and wherein said aperture is centrally located in said one of said plate members.

29. A torque transducer for measuring the torque input or output of a rotary machine having a housing, said torque transducer comprising first and second mounting plate members spaced axially apart along the rotational axis of said machine, said first plate member being rigidly fixed to said housing of said machine and said second plate member being secured against rotation with said housing, and flexure means interconnecting said first and second plate members and providing for rotational motion of the assembly of said machine and said first member about said axis and relative to said second plate member by the reaction torque applied during operation of said machine, and means for measuring the rotation of said first plate member relative to said second plate member, one of said plate members being configured and disposed to mate with and seat against an opposing, axially directed end face of said housing, said machine having an energy-transferring shaft, and said one of said plate members having an aperture through which said shaft freely extends.

30. The force transducer defined in claim 29 wherein said flexure means comprises a plurality of angularly spaced apart beams extending longitudinally of said axis and being fixed to said first and second plate members to support the assembly of said first plate member and said machine in cantilever fashion from said second plate member.

31. The torque transducer defined in claim 30 wherein said one of said plate members is said first plate member.

32. The torque transducer defined in claim 29 wherein said shaft extends coaxially through said aperture.

33. A torque transducer for measuring the torque input or output of a rotary machine and comprising first and second mounting plate members spaced axially apart along the rotational axis of said machine, said first plate member being rigidly fixed to the housing of said machine and said second plate member being secured against rotation with said housing, a plurality of flexure beams extending axially between said members and interconnecting said first and second plate members to provide for rotational motion of the assembly of said machine and said first member relative to said second plate member by the reaction torque applied during operation of said machine, means for measuring the rotation of said first plate member relative to said second plate member, and means for selectively adjusting the axial length of flexure of said beams.

34. A torque transducer for measuring the torque input or output of a rotary machine having a housing wherein said rotary machine has a housing formed with an axially directed end portion that is configured to mate with a mounting portion of a support structure to enable said machine to be mounted directly on said support structure in absence of said transducer, with one of said portions having a projection and the other of said portions having a complementary recess capable of matingly receiving said projection, said torque transducer comprising first and second mounting plate members spaced axially apart along the rotational axis of said machine and being interposed axially between said end face and said mounting portion, said first plate member being rigidly fixed to the housing of said machine and said second plate member being secured to said mounting portion, flexure means interconnecting said first and second plate members and providing for rotational motion of said machine and said first member relative to said second plate member by the reaction torque applied during operation of said machine, said flexure means comprising a plurality of angularly spaced apart beams extending longitudinally of the axis about which said machine is rotatable and being fixed to said first and second plate members to support the assembly of said first plate member and said machine in cantilever fashion from said second plate member, and means for measuring the rotation of said first plate member relative to said second plate member, said plate members respectively having axially oppositely facing, complementary recessed and projecting sections respectively configured to mate with said projection and said recess, and said first and second plate members being respectively adapted to seat against said end portion and said mounting portion in assembled relation with said machine and said support structure, with said projecting section being received in said recess and said recessed section receiving said projection.